United States Patent [19]

Tomar

[11] Patent Number: 4,660,830
[45] Date of Patent: Apr. 28, 1987

[54] BASEBALL OR SOFTBALL

[75] Inventor: Julius Tomar, Port-au-Prince, Haiti

[73] Assignee: Home of Champions, S.A., Port-au-Prince, Haiti

[21] Appl. No.: 698,176

[22] Filed: Feb. 4, 1985

[30] Foreign Application Priority Data

Jan. 24, 1985 [HT] Haiti .............................................. 1-J

[51] Int. Cl.$^4$ .............................................. A63B 37/00
[52] U.S. Cl. ........................ 273/60 B; 273/DIG. 008;
 264/239
[58] Field of Search .................... 273/DIG. 008, 60 R,
 273/60 A, 60 B, 58 A, 63 R, 63 F, 63 G, 230,
 218, 59 R, 59 A, 59 B, DIG. 005, 217, 223

[56] References Cited

U.S. PATENT DOCUMENTS

| | | | |
|---|---|---|---|
| 2,743,931 | 5/1956 | Pooley et al. | 273/199 |
| 2,753,599 | 7/1956 | Pietraszek et al. | 18/47.5 |
| 2,938,237 | 5/1960 | Kern et al. | 18/59 |
| 3,069,170 | 12/1962 | Dillon, Jr. | 273/199 |
| 3,976,295 | 8/1976 | Heald, Jr. | 273/60 |
| 4,149,720 | 4/1979 | Heald, Jr. | 273/60 |
| 4,203,941 | 5/1980 | Brooker | 273/60 B |
| 4,211,407 | 7/1980 | Tomar | 273/60 B |
| 4,364,565 | 12/1982 | Tomar | 273/60 R |
| 4,367,873 | 1/1983 | Chang et al. | 273/60 R |
| 4,431,193 | 2/1984 | Nesbitt | 273/218 |
| 4,463,951 | 8/1984 | Kumasaka et al. | 273/58 A |
| 4,498,667 | 2/1985 | Tomar | 273/60 B |
| 4,529,200 | 7/1985 | Miller et al. | 273/60 B |
| 4,568,083 | 2/1986 | Miller | 273/DIG. 005 |
| 4,598,909 | 7/1986 | Ventura et al. | 273/60 B |

FOREIGN PATENT DOCUMENTS 2125758 7/1972 Fed. Rep. of Germany ... 273/DIG. 008
2508804 1/1983 France .............................. 273/58 A

OTHER PUBLICATIONS

"Official Guide & Rule Book" of the Amateur Softball Association, 1986, pp. 54–55.

Primary Examiner—George J. Marlo
Attorney, Agent, or Firm—Webb, Burden, Robinson & Webb

[57] ABSTRACT

A game ball for use as a conventionally sized baseball or softball comprises an inner core of a first material characterized by at least high durability; at least one locator pin of the first material extending radially outwardly from and affixed to the inner core; and a spherical outer core of a second material, characterized by at least high durability and conventional rebound. Preferably, the inner core has four integrally formed locator pins extending radially outwardly therefrom. These pins are positioned 90° apart on an imaginary plane through the equator of the inner core. The first material is selected from the group consisting of cork, kapok, rubber, or a thermoplastic resin such as an ethylene vinyl acetate copolymer, an ethylene acrylic acid copolymer or a blend of both. The second material for the outer core, preferably polyurethane foam, consists of 100 parts of a resin mixture, a blowing agent, and either 51 or 60 parts isocyanate. The resin mixture comprises between about 95 or 97 percent polyether polyol and small amounts of silicone and a catalyst.

15 Claims, 7 Drawing Figures

BASEBALL OR SOFTBALL

BACKGROUND OF THE INVENTION

My invention relates to game balls and to the methods of making them. More particularly, my invention relates to baseballs and softballs having an inner core of a first material and an outer core of a second material. The method of making the compound core of my invention comprises forming the inner core with at least one locator pin extending radially outwardly; centering the inner core within an outer core mold; and forming the outer core.

DESCRIPTION OF THE PRIOR ART

The game balls that are used by baseball and softball players in the United States are constructed of various materials having a vast range of physical properties. Typically, the baseballs used by the professional leagues and Little Leagues are formed of a cork or rubber core wound with wool yarn and cotton thread. Most restricted flight softballs (used in slow pitch) and regular flight softballs are formed of a cork or kapok core wound with synthetic yarn or thread. The resultant game ball core is then surrounded by stitching together a two-piece cover of leather, plastic, vinyl or the like. Alternatively, practice game balls are formed with a one-piece cover having simulated stitchings for greater durability. Exemplary of such practice game balls is U.S. Pat. No. 3,069,170.

Generally, the density of these game balls, along with their attendant properties, is determined by the core material selected and how tightly the yarn or thread is wound. Thus, there exist variables in game ball manufacturing which are not capable of adequate control. As the cost of winding the cores continues to rise due to the substantial labor involved, ball manufacturers have searched for new core materials which would increase product consistency and reduce costs while retaining the same playing characteristics.

Some manufacturers have experimented with the formation of single ball cores made from plastic resins and the like. Exemplary of single cores of polyurethane are U.S. Pat. Nos. 3,976,295 and 4,149,720. Exemplary of single cores of various thermoplastic copolymer blends are U.S. Pat. Nos. 4,211,407 and 4,364,565.

Cores comprised of a polyurethane foam throughout have shown an increased tendency to crack. Furthermore, due to the lack of control over the foaming of the polyurethane within the mold, these cores may expand unevenly. As such, the circumference of the resultant core may not be uniform.

It is further known to create game balls with an inner core surrounded by an outer "shell" of nylon or plastic. The outer shell may either be coated around the inner core, U.S. Pat. Nos. 2,743,931 and 2,753,599, or fused to the inner core, U.S. Pat. No. 2,938,237.

These substitutes have not been readily accepted by the public due to the inability to duplicate the characteristics of the conventional balls as well as to a general reluctance for change. As usage has gradually increased, so have reports of problems with the substitute ball cores. Some of the game balls have shown less resistance to deformation upon prolonged hitting.

Finally, it is known in the art that an intermediate core can be centered within an outer mold by the positioning of the core on pins extending from the interior surface of the outer mold. U.S. Pat. No. 4,498,667.

SUMMARY OF THE INVENTION

I have now provided a game ball having a compound core comprised of an inner core of a first material characterized by at least high durability; at least one locator pin of the first material extending radially outwardly from and affixed to the inner core; and an outer core of a second material characterized by at least high durability and conventional rebound. In addition, I have provided a method of making these game balls which centers a formed inner core within the outer core mold by at least one and preferably a plurality of locator pins, extending radially outwardly from the inner core.

The inner core can be comprised of cork, kapok, rubber or a blend of thermoplastic polymers and copolymers. Preferably, the inner core is comprised of an ethylene vinyl acetate copolymer, an ethylene carboxylic acid copolymer or a blend of both. In these preferred embodiments, the locator pins are integrally formed as part of the inner core.

The outer core is comprised of a second material which will determine the rebound characteristics of the completed game ball. Preferably, the second material is comprised of a polyurethane foam of high durability.

The method of forming the game ball of my invention comprises formation of the inner core having at least one locator pin extending radially outwardly; the centering of the inner core by the locator pin within an outer core mold; and formation of the outer core. Preferably, any flash or excess locator pin extending beyond the circumference of the outer core is removed before a two-piece cover is sewn around the outer core.

The resultant game ball is less costly than a game ball having a core comprised solely of polyurethane foam. Additionally, since less polyurethane foam is required in a preferred embodiment of my invention, the resultant outer core circumference should be more uniform. My invention should be less susceptible to cracking upon prolonged hitting since two different materials possessing high durability will be used in forming the compound core.

DESCRIPTION OF THE PREFERRED EMBODIMENTS

In the practice of my invention of a game ball having a compound core, the inner core and outer core are to be made of different materials, each with high durability. Since the rebound of the completed ball is generally determined by the characteristics of the material selected for the outer core, a variety of materials can be used for formation of the inner core which have heretofore been used to comprise the entire core of previous game balls. Even common baseball and softball core materials such as cork, kapok and rubber may be used for the inner core, provided that at least one locator pin of the first material is either affixed to or integrally formed with the inner core and extends radially outwardly therefrom. Preferably, the inner core includes four integrally formed locator pins positioned 90° apart on an imaginary plane through the equator of the inner core and extending radially outwardly therefrom.

The inner core may also be formed by the injection molding of a thermoplastic copolymer. Preferably, an ethylene vinyl acetate copolymer, an ethylene acrylic acid copolymer or a blend of both can be used, as were used to comprise the entire ball core in U.S. Pat. No. 4,364,565. The ethylene vinyl acetate copolymer selected as the material for the inner core should have between 12 and 30% by weight polymerized vinyl acetate units therein. In a particular embodiment of my invention, Example I, the inner core is a 50/50 mixture of ethylene vinyl acetate copolymers with 12.5% and 24%, respectively, by weight polymerized vinyl acetate units therein. In another preferred embodiment, Example II, a blend of 90 parts ethylene acrylic acid copolymer is mixed with 10 parts of an ethylene vinyl acetate copolymer having 12% polymerized vinyl acetate units therein.

Figure 5:
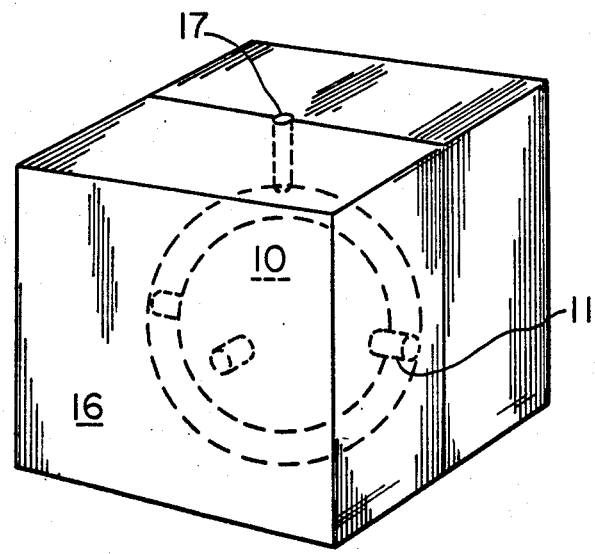
FIG. 5 is an isometric view of the joined halves of an outer core mold in which the inner core and outer core cavity is shown in dotted lines.

Preferably, the outer core is formed of polyurethane foam by adding the reactants to create the foam in the outer core mold since the foam expands and sets without building up excess heat thereby avoiding the need of cooling. Alternatively, the outer core may be formed by injection molding a thermoplastic resin mixture, different from that used for forming the inner core, through a mold vent 17, FIG. 5. Such a technique was practiced for the entire core in U.S. Pat. Nos. 3,976,295 and 4,149,720. Should the outer core be injection molded, the application of a layer of adhesive to the inner core may become unnecessary due to the fusing together of the two cores.

Preferably, a conventionally sized softball of my invention, should have an outer core thickness on the outer of 12 to 13 mm. As a result, the outer core thickness for a conventional softball will be on the order of 24.3–30.2 percent of the radius of the softball, or on the order of 12.2–15.1 percent of the diameter of the softball. In a preferred embodiment of the invention, the inner core created by an ethylene vinyl acetate copolymer should weigh on the order of 60 and 70 grams; the outer core of a polyurethane foam should weigh on the order of 85 and 95 grams.

The method of formation of the game ball requires three basic steps: the formation of an inner core having at least one locator pin; the centering of the inner core in an outer core mold by use of the locator pin; and the formation of the outer core so as to surround and adhere to the inner core. Additionally, a completed outer core may require the removal of any flash, sprue and any excess locator pin extending beyond the circumference of the outer core. Thereupon, a cover may be added depending upon whether the resultant baseball or softball is to be used for practice or game conditions.

Figure 6:
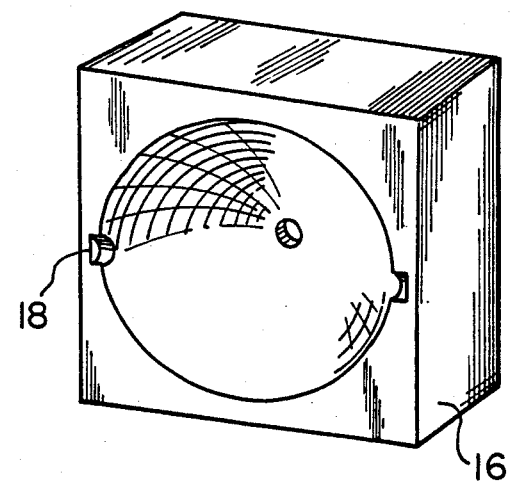
FIG. 6 is an isometric view of a rear outer core mold half.
Figure 7:
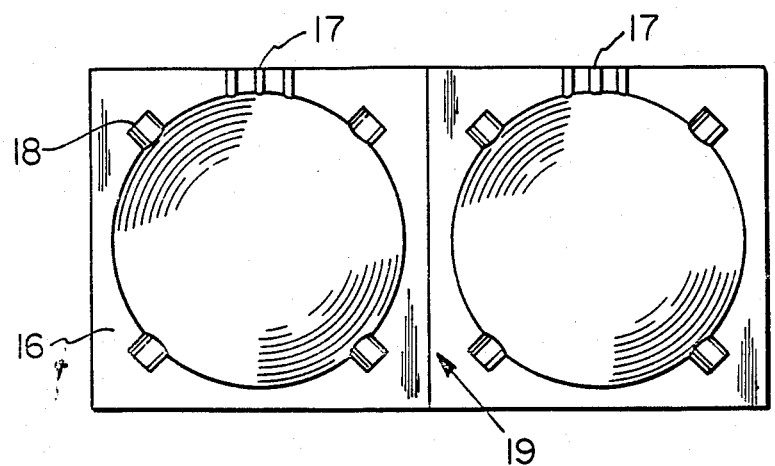
FIG. 7 is a plan view of an open outer core mold in a preferred embodiment.

The centering of the inner core 10 within the outer core mold 16 by the locator pins 11 may be accomplished in a variety of ways. For example, the outer core mold 16, FIG. 6, may be cast to have a series of locator pin supports 18, of a specified depth and a diameter slightly larger than the locator pin diameter, for aligning and centering the inner core within the mold. In a preferred embodiment, FIG. 7, four locator pin supports 18 are spaced 90° apart from each other, starting at 45° from the center vent hole of the three vent holes 17, and are partially formed in each half of the outer core mold. The two outer mold halves 16 may be connected by a hinge 19 if desired. Alternatively, a plurality of locator pins 11, in FIG. 1, may center and support the inner core within the mold 16 by their being appropriately spaced and of an approximate length equal to the diameter of the outer core mold. Thus, the inner core locator pins will wedge against the interior surface of the mold without need of corresponding locator pin supports.

Figure 1:
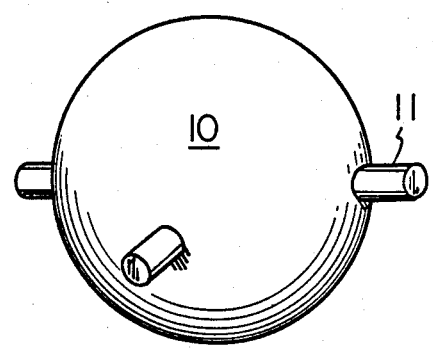
FIG. 1 is an isometric view of an inner core having locator pins extending radially outward.

Regardless of the materials selected, a completed inner core 10, FIG. 1, has at least one locator pin 11, and preferably four locator pins, extending radially outwardly therefrom and affixed thereto. Depending upon the size of the pins selected and the type of outer mold employed, excess locator pins 11 may extend beyond the outer core 12, FIG. 2, after removal from the mold, in which case the excess is removed with the flash, etc. In a preferred embodiment of the invention, FIG. 3, at least four (4) locator pins, 90° apart, are integrally formed with the inner core and extend radially outwardly from an imaginary plane through a diameter of the inner core 10. A layer of adhesive 13 is applied to the inner core 10 and locator pins 11 before being positioned in the outer core mold 16, FIG. 5. The adhesive need only withstand temperatures up to about 120° F. Standard rubber cements or polyurethane cements are adequate. Then, an outer core 12 is formed so as to surround the layer of adhesive 13.

Figure 2:
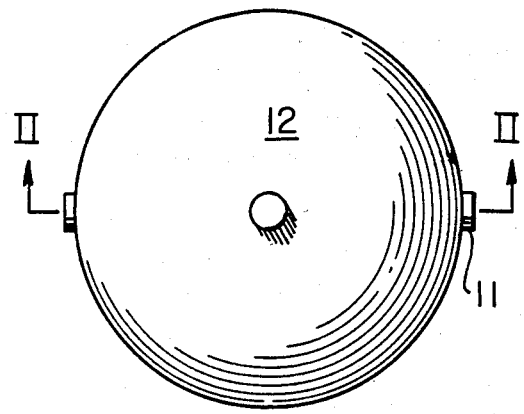
FIG. 2 is a front view of a ball upon removal from the outer core mold.
Figure 3:
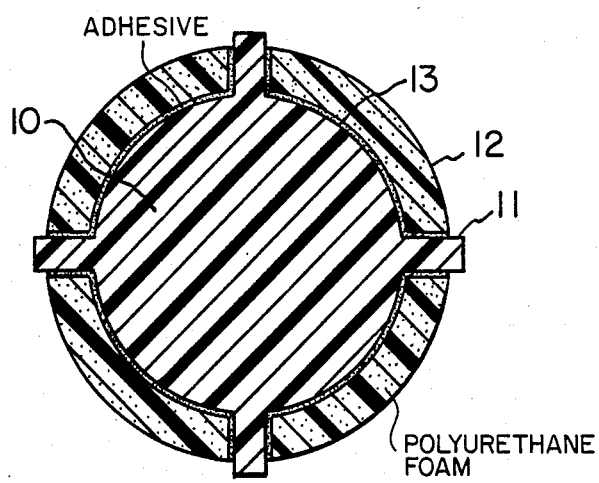
FIG. 3 is a section of FIG. 2 taken along section line II—II of FIG. 2.
Figure 4:
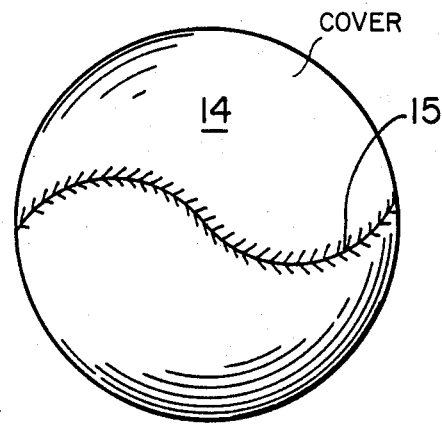
FIG. 4 is an isometric view of the resultant game ball.

The completed outer core 12, in FIG. 2, may then be surrounded by a two-piece cover 14, FIG. 4, stitched together so as to form a baseball or softball suitable for game use. Alternatively, a stitch pattern 15 may be engraved within the outer core mold 16 so that a practice game ball is formed without an outer cover 14.

The following examples of the inner core and the outer core mold compositions are not intended to limit the invention, but are by way of illustration.

EXAMPLE I

Fifty (50) parts of a particulate ethylene vinyl acetate copolymer resin having twenty-four percent (24%) by weight polymerized vinyl acetate units therein and a melt flow index=3, sold as Evatane 2403 by ICI, is tumble blended with fifty (50) parts of a particulate ethylene vinyl acetate copolymer resin having twelve and one-half percent (12.5%) by weight polymerized vinyl acetate units therein and a melt flow index=4, sold as Evatane 6455 by ICI.

The tumble-blended mixture is charged to a screw and ram injection molding machine having a feed temperature of 220° C. and a barrel temperature of 250° C. and a nozzle temperature of 260° C. The molten resinous mass is injected from the nozzle into the cavity of the inner core mold which is chilled by a circulatory water cooling at about 7° C. Upon injection of the thermoplastic flowable mass into the mold cavity, the resulting gas expands and foams the thermoplastic flowable mass to fill the inner core and integral locator pin mold cavity. The thermoplastic mass is held in the inner core mold for about 5 minutes and removed. Upon removal, the molded resin is in the form of the inner core with at least one integral locator pin. The sprue formed within the channel of the mold is cut and the inner core is placed in a water bath maintained at 5° to 8° C. for 15 minutes. During the cooling, the core expands then shrinks to normal size. The inner core is then removed from the water bath and stored at an ambient temperature for 24 hours. The resultant inner core has a skin thickness of about 3.2 mm. A skin of this thickness is adequate in strength to prevent rupture of the inner core by blowing agent upon removal from its mold cavity.

A layer of rubber cement is applied so as to surround the entire inner core and locator pins. The inner core is then centered into the spherical outer core mold by positioning the locator pin or pins within the appropriate locator supports formed in the outer core mold.

A polyurethane resin mixture, sold as RU6733 by Renosol, is poured into the outer core mold. This two-part system has a ratio of 100 parts of resin to 60 parts of a purified grade of isocyanate. The resin itself is about 95% polyether polyol with small amounts of catalyst and silicone. The blowing agents of water and Freon in the resin cause the resin to expand in the mold so as to expand the polyurethane foam, making the high density outer core surface. The outer core mold is closed and allowed to set at ambient temperature. The mold is opened and the outer core is removed. The flash and any extension of the locator pin beyond the outer core circumference are sanded away. A two-piece leather cover is sewn around the outer core so as to produce a regular flight softball.

EXAMPLE II

Ninety (90) parts of the particular ethylene acrylic acid copolymer having acrylic acid copolymerized therein, sold as "SURLYN" 1652 by DuPont, is used. "SURLYN" 1652 has the following properties: a zinc cation; a melt-flow index=5.0 gm/10 min.; specific gravity=0.94; area yield=4.2 m$^2$/kg @ 0.25 min.; a tensile impact=925 kJ/m$^2$ @ 23° C. and =560 kJ/m$^2$ @ −40° C.; a tensile strength=21.4 MPa; and an elongation %=500. The ethylene acrylic acid copolymer is tumble blended with ten (10) parts of a particular ethylene vinyl acetate copolymer having twelve percent (12%) vinyl acetate polymerized units therein, sold as "ELVAX" 660 by DuPont, with 4.5 parts of a blowing agent having an active agent temperature of 170° C. evolving 40 mls of gas at standard temperature and pressure.

The tumble-blended mixture is charged to a screw and ram injection molding machine at the respective temperatures listed in Example I. Upon injection of the thermoplastic flowable mass into the mold cavity, the resultant gas expands and foams the thermoplastic flowable mass to fill the mold cavity shaped for an inner core with four (4) integral pins located 90° apart on a horizontal plane through the center of the spherical mold. The thermoplastic mass is held in the mold for about 5 minutes and removed. The sprue is cut and the inner core is placed in a water bath maintained at 5° to 8° C. for 15 minutes. During cooling, the core expands and shrinks back to normal size. The core is removed from the water bath and stored at an ambient temperature for 24 hours. The resultant core has a skin thickness of about 3.2 mm.

A layer of polyurethane cement is applied so as to completely surround the inner core and locator pins. The inner core is then positioned in the outer core mold by wedging the four integral locator pins against the interior surface of the outer core mold. A polyurethane resin mixture, sold as RU6734 by Renosol, is poured around the inner core centered in the outer core mold. This particular resin blend has a mixed ratio of 100 parts resin to 51 parts of a purified grade of isocyanate. The resin is about 97% polyether polyol with small amounts of catalyst and silicone. The blowing agents of water and Freon are added so as to expand the polyurethane foam within the outer core mold. The foamed mold is allowed to set. The outer core is removed, and the flash and any extensions of the locator pins beyond the outer core circumference are ground away using a grinding wheel. A two-piece cover is sewn around the core so as to produce a restricted flight softball.

Although the invention has been described with reference to specific materials under specific conditions, the invention is only to be limited insofar as is set forth in the accompanying claims:

I claim:

1. In a baseball or softball, the combination comprising:
   an inner core defining the innermost component of said game ball and formed of a first material characterized by at least high durability;
   at least one locator pin of the first material extending radially outwardly from and affixed to the inner core; and
   a spherical outer core of a foamed polyurethane material, characterized by at least high durability and conventional rebound, surrounding and tightly adhered to the inner core and the locator pin and having a thickness equal to the length of said pin.

2. The ball of claim 1 wherein said spherical outer core of said polyurethane foam material is about 12–13 mm. in thickness.

3. The ball of claim 1 wherein said first material is selected from the group consisting of cork, kapok, rubber or a thermoplastic resin.

4. The ball of claim 3 wherein said thermoplastic resin is selected from the group consisting of an ethylene vinyl acetate copolymer, an ethylene acrylic acid copolymer or a blend of both.

5. The ball of claim 4 wherein said ethylene vinyl acetate copolymer selected for forming the inner core has between 12 and 30 percent by weight polymerized vinyl acetate units therein.

6. The ball of claim 3 wherein said thermoplastic resin is comprised of a 50/50 mixture of partially blown ethylene vinyl acetate copolymers having 12.5 percent and 24 percent, respectively, by weight polymerized vinyl acetate units therein.

7. The ball of claim 1 which is a conventionally sized softball, wherein said inner core weighs between about 60 to 70 grams and said spherical outer core weighs between about 85 to 95 grams.

8. The ball of claim 1 wherein said polyurethane foam material consists of 60 parts isocyanate and 100 parts of a resin mixture and a blowing agent combined to form the outer core of a regular flight softball.

9. The ball of claim 8 wherein said resin mixture further comprises about 95 percent polyether polyol and small amounts of silicone and catalyst.

10. The ball of claim 1 wherein said polyurethane foam material consists of 51 parts isocyanate and 100 parts of a resin mixture and a blowing agent combined to form the outer core of a restricted flight softball.

11. The softball of claim 10 wherein said resin mixture further comprises about 97 percent polyether polyol and small amounts of silicone and catalyst.

12. The ball of claim 1 wherein a plurality of locator pins extend radially outwardly from said inner core.

13. The ball of claim 1 wherein said locator pin is integral with said inner core.

14. The ball of claim 1 wherein four locator pins are positioned 90° apart.

15. The ball of claim 1 further comprising a layer of adhesive between said inner and outer cores.

* * * * *